United States Patent [19]
Eisenmann

[11] 3,764,013
[45] Oct. 9, 1973

[54] APPARATUS FOR SEPARATING PAINT OR THE LIKE FROM WATER

[75] Inventor: Rolf Eisenmann, Stuttgart-Weilimdorf, Germany

[73] Assignee: Otto Durr K.G., Stuttgart-Zuffenhausen, Germany

[22] Filed: July 29, 1970

[21] Appl. No.: 59,132

[30] Foreign Application Priority Data

Apr. 7, 1970 Germany.................P 20 16 414.1

[52] U.S. Cl.................. 210/205, 209/170, 210/44, 210/221, 210/256, 210/261, 210/525
[51] Int. Cl............................................. B03d 1/00
[58] Field of Search..................... 210/44, 221, 256, 210/205, 261, 525, 169, 170

[56] References Cited
UNITED STATES PATENTS

| | | | |
|---|---|---|---|
| 2,778,499 | 1/1957 | Chamberlain et al. | 210/44 X |
| 1,180,089 | 4/1916 | Thompson et al. | 210/221 X |
| 2,440,514 | 4/1948 | Karlstrom | 210/44 |
| 3,179,252 | 4/1965 | Vrablik | 210/44 X |

*Primary Examiner*—Michael Rogers
*Attorney*—Michael S. Striker

[57] ABSTRACT

A method and apparatus for separating paint or the like from water, especially for purifying the water before passing it into a lake, river or the like, by intimately mixing the paint-contaminated water with a coagulant and compressed air so as to form a foamy mixture, then allowing the foam to float quickly to the surface of the water, wiping the foam off said surface and filtering the water before discharging it from the apparatus. The apparatus is preferably designed as a circular unit requiring relatively little ground space in which the various separating containers are of an annular shape surrounding each other about a common axis, while the coagulator is mounted above the central cylindrical space within the innermost annular container and extends likewise coaxially thereto.

10 Claims, 4 Drawing Figures

APPARATUS FOR SEPARATING PAINT OR THE LIKE FROM WATER

The present invention relates to a method and an apparatus for separating paint or the like from water, and especially particles of paint, enamel or the like from the wash water of electrophoresis painting apparatus, by first adding a coagulant to the watery mixture and subsequently separating and removing the constituents of the paint or the like from the water. More particularly, the invention relates to such a method in which simultaneously or nearly simultaneously with the addition of the coagulant the mixture of water and paint or the like is mixed with air and the resulting foamy mixture is subjected to a separating process in which the paint foam floats to and collects on the surface of the water and is then removed therefrom.

The wash water which is discharged from painting apparatus and especially from those which operate according to the electrophoresis method generally contains a suspension of approximately 0.1 to 0.3 percent of paint in the water. Since such a paint concentration is approximately ten times as high as is legally allowed in waste water which is to be passed through sewers or channels, for example, lakes, rivers or the like, it is necessary to reduce the paint content of the water considerably. This has so far been done by mixing the wash water with a so-called coagulant, for example, Ca Cl$_2$, which causes small paint particles to conglomerate into larger particles. According to Stoke's equation, the sedimentation of these particles occurs the more quickly the larger the particles are. However, the period which this known method requires for effecting the sedimentation, i.e., the floating of the paint particles to the surface of the water, is always relatively long.

It is an important object of the present invention to reduce considerably the length of time which was previously required for effecting the floatation of the paint and its separation from the water. According to the invention, it has been found that this object may be attained by intensively mixing the paint-contaminated water with air and the coagulant.

For attaining an intimate mixture of the paint-contaminated water with air and the coagulant, it is an important feature of the invention to subject this mixture many times to a forced circulation by injecting the contaminated water under a high pressure into a coagulator which comprises a circulating chamber. It has been found that such a method involving the use of such a coagulator not only accelerates and perfects the mixing but also the coagulation of the paint particles and their separation from the water. The period of separating the paint particles from the water may thus be reduced to a fraction of the length of time which was previously required. During the separating process, the coagulated paint rises in the form of a foam to the surface of the water and, since by the occlusion of air this foam floats as a specifically lighter mass on the water surface, it may be quickly and reliably removed therefrom.

Since after the paint foam has collected on the surface of the water, the water still contains a residue of paint, it is then preferably subjected to an additional clearing or purifying treatment. While the treatment of collecting the paint foam on the surface of the water, for example, in a special separating container, only requires a short time which may amount, for example, only to a few minutes, it may be advisable to provide a greater length of time for the additional purifying treatment, for example, in a clearing basin.

In addition, it may be advisable to provide suitable filtering means for subjecting the water which has been cleared in the separating container and especially in the subsequent clearing basin to an additional purification so that the water which is finally discharged from the entire treating plant will be practically pure.

Another object of the present invention consists in providing further improvements for rendering the method as well as the apparatus according to the invention as economical as possible.

For attaining this object, it is an important feature of one preferred embodiment of the invention that for producing a strong circulation and intimate mixture of the paint-contaminated water with the coagulant and air in the coagulator into which the contaminated water is first supplied directly without pressure, this mixture, after passing once from the coagulator to the separating apparatus and especially to an additional mixing chamber thereof, is conducted from the latter by a pump through an injection nozzle again into the coagulator so as to produce a strong current therein. Since the watery mixture after it has previously been partly cleared is used again for producing the strong circulation and intimate mixture within the coagulator by the injection effect of the injection nozzle, it is possible to omit entirely the supply of fresh water which was required in the known apparatus.

Another feature of the invention consists in conducting the coagulant directly into the mixing chamber of the coagulator which preferably consists of a circulating chamber. Compressed air may then be blown not only into the coagulator but also into the additional mixing chamber.

A further object of the invention consists in providing an apparatus for carrying out the inventive method very efficiently by designing and arranging the individual parts of the apparatus so as to cooperate very effectively with each other and to require the least possible ground or floor space.

Another important feature of the invention for attaining this object consists in combining the coagulator and especially the circulating chamber thereof with the separating apparatus and especially a sedimentation or settling chamber of the latter so as to form a substantially circular unit the individual containers or chambers of which extend coaxially to each other. According to a further feature of the invention, the coagulator and especially the circulating chamber thereof is preferably located radially inside of, and partly or entirely above the separating apparatus which consists of an annular chamber system. The separating apparatus preferably comprises in radial succession from the inside to the outside first an additional mixing chamber, then an annular sedimentation or settling chamber and finally an annular overflow and/or discharge chamber.

An apparatus of this type of construction has the following advantages:

Due to the concentric arrangement of the circulating chamber of the coagulator and the chamber or chambers of the settling apparatus, long peripheral separating walls are formed between the adjacent chambers. If there is a plurality of concentric chambers, the peripheral lengths of the successive chambers and the rate of flow from one chamber to the other decrease radially toward the outside. This is especially of advantage for the successive separation of the foam from the water and for further filtering the water after it has been cleaned at least substantially and before it is finally discharged from the entire unit. Due to the great peripheral length of the different annular chambers, it is also possible to avoid interferences in the overflow of the liquid along the overflow edges between those adjacent chambers where such an overflow should occur. The filtering surfaces which should be provided near the outer periphery of the entire unit may for the same reason also be made of a very large size.

The concentric arrangement of the different containers or chambers of the entire unit also permits the same to be very easily assembled as well as partly or entirely dismantled. This, in turn, permits the operation of the entire unit to be easily supervised and its elements to be cleaned. Especially the injection nozzle, the nozzle for the coagulant and the air nozzle are easily accessible and may be quickly checked and cleaned, especially if the coagulator which comprises a circulating chamber is mounted on the other parts of the unit by quickly releasable locking means. The foamy sludge which forms on the surface of the liquid in an annular settling chamber may also be easily stripped or wiped off, for example, by a stripping element in the nature of a wiper which revolves about the vertical axis of the entire circular unit along the surface of the liquid in this chamber.

A further feature of the invention consists in interrupting at least the outer annular chambers of the settling apparatus along a sector of a certain size so as to permit the sludge which has been stripped off the surface of the liquid in the main settling chamber to be collected in removed and conveyed away, for example, by a movable container in the form of a carriage which may be moved into this sector and into which the sludge which is stripped off by the wiper may be discharged directly. The wiper may for this purpose carry out either a reciprocating movement about the vertical axis of the entire unit by moving back and forth from the upper edge of one wall of the sector over the settling chamber to the upper edge of the other wall of the sector or it may move continuously in one rotary direction by passing successively over both edges of the omitted sector. The wiper may either be driven from a position above the coagulator or, especially if it only has to carry out a reciprocating movement, it may be connected to its driving means through a slot which is provided between the upper coagulator and the lower chamber unit forming the settling apparatus.

According to a further feature of the invention, the cylindrical or substantially cylindrical outer wall of the coagulator is provided at its upper end with an annular slot which serves as an overflow for the liquid foam mixture which is formed therein so that this mixture can flow down toward all sides into the open upper end of one of the chambers of the settling apparatus. This annular slot is preferably adjustable to different widths, for example, by means of a cover which is adjustably screwed on and closes the upper end of the circulating chamber of the coagulator.

These and still further objects, features and advantages of the present invention will become further apparent from the following detailed description thereof which is to be read with reference to the accompanying drawings, in which —

FIG. 3 shows a top view of a part of the unit according to FIG. 2; while

Figure 1:
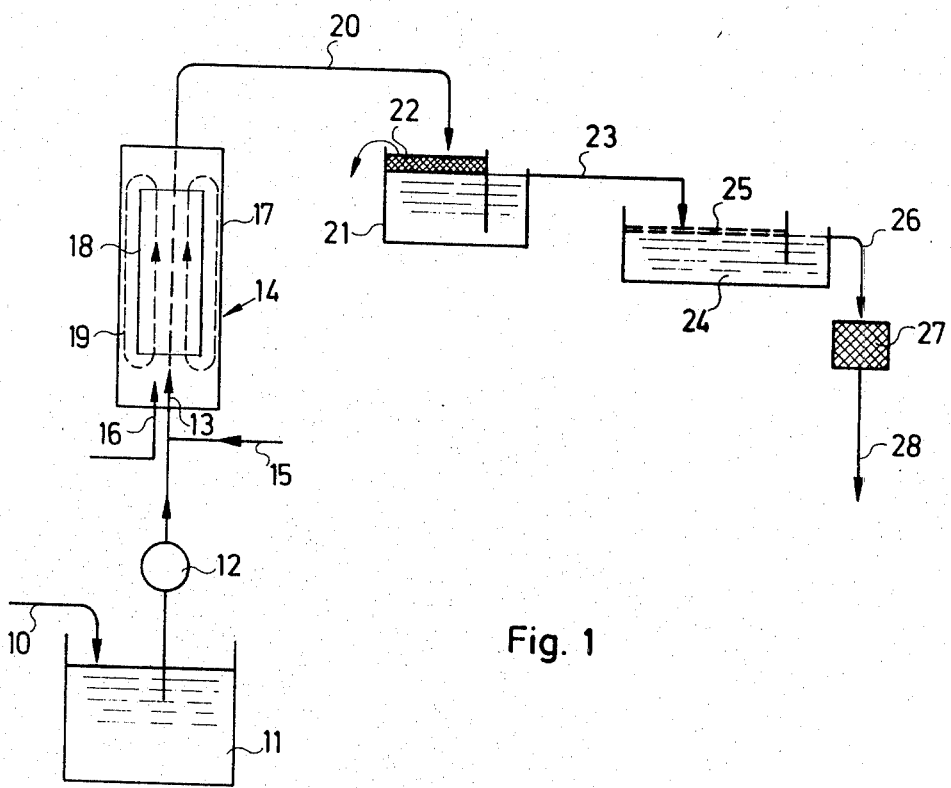
FIG. 1 shows a diagrammatic illustration of the method according to the invention.

Referring first particularly to FIG. 1 of the drawings, the wash water which is mixed with paint particles and comes, for example, from an electrophoresis painting apparatus passes through a line 10 into a storage or booster tank 11 from which it is then drawn out by a pump 12 and passed under pressure through an injection nozzle 13 into a coagulator which comprises a circulating chamber 14. Before the water and paint mixture enters this chamber 14, it is supplied through a line 15 with a coagulant, for example, calcium chloride. At the same time when the mixture of water, paint and coagulant is injected into the circulating chamber 14, air is also supplied thereto through a line 16. Although the air may also be drawn into the circulating chamber 14 by the injection effect of the water mixture passing through the nozzle 13, it is more advisable to blow the air into the chamber 14 under pressure.

The circulating chamber 14 essentially consists of an outer housing 17 in which an inner pipe 18 is mounted at such a distance from the wall of housing 17 that the liquid which is injected through the nozzle 13 substantially in the axial direction of the inner pipe 18 and fills the circulating chamber 14 may circulate through the inner pipe 18 and the annular chamber 19 between this pipe and the housing 17 and around the upper and lower ends of the inner pipe 18.

Due to the injection effect of the water mixture passing into chamber 14 through the nozzle 13, a forced circulation of this mixture together with the air and coagulant is produced which results in an intimate mixture of the different components within the circulating chamber 14 by circulating several or many times around the inner pipe 18 under the effect of the injected current of liquid. This injected current draws from the annular chamber 19 a certain amount of water which is mixed with the injected current. A corresponding amount of the mixture then flows mostly in the form of a liquid foam from the circulating chamber 14 through a line 20 into the separating container 21 in which the foam rises as a foam layer 22 to the surface of the water. This foam layer may then flow off via an overflow to the outside or it may be skimmed off the surface of the water by simple means, while the water passes through the foam and leaves the separating container 21 through an overflow line 23. The water and paint mixture needs to remain within the separating container 21 only for a very short time, for example, for a few minutes, since the floating of the paint particles to the surface of the liquid within this container occurs almost instantaneously. From the overflow line 23 the liquid passes into a clearing basin 24 in which the paint particles which still remain in the liquid will separate therefrom and form a more or less solid cake of paint 25 on the surface of the liquid. This cake may then be easily removed by a stripper, wiper or the like.

The water which then contains only very small amounts of paint particles may then be passed through a filter 27, for example, a coke filter or a paper filter, before it is discharged through a line 28 to the sewer.

Figure 2:
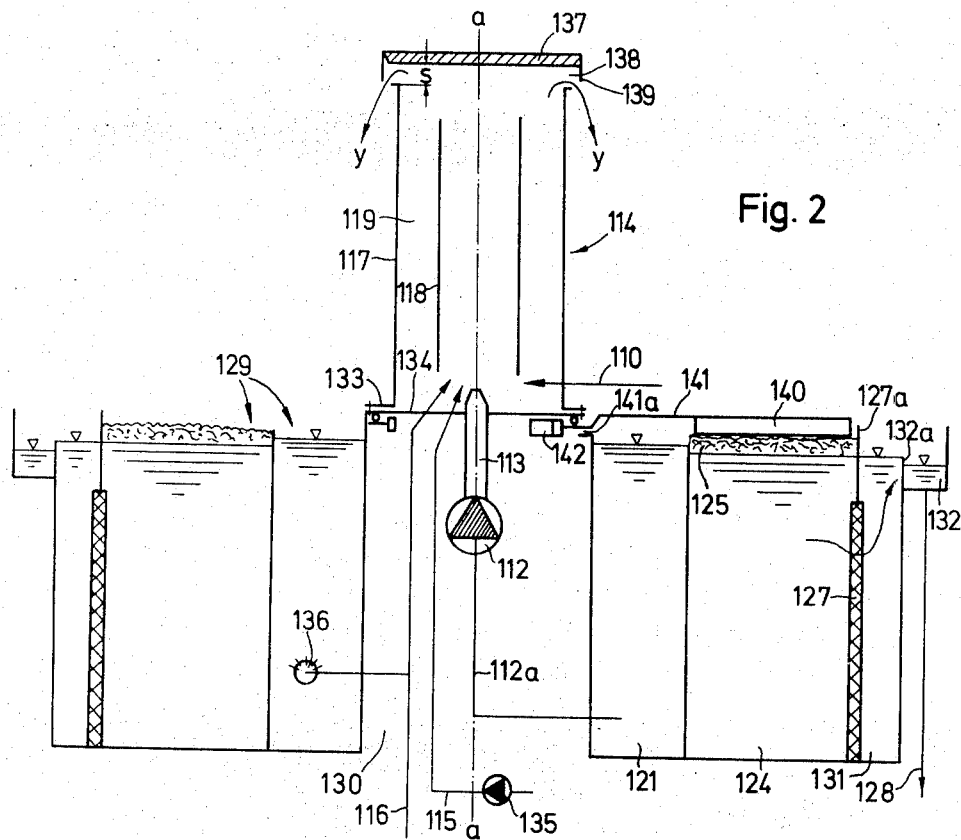
FIG. 2 shows an axial cross section of an apparatus according to the invention in the form of a circular unit.
Figure 3:
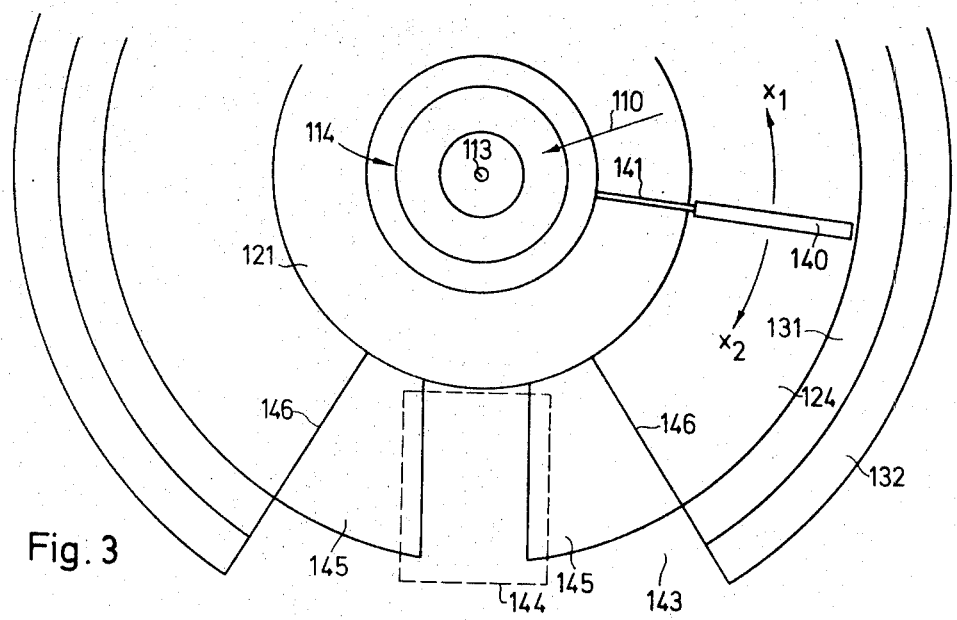
Figure 4:
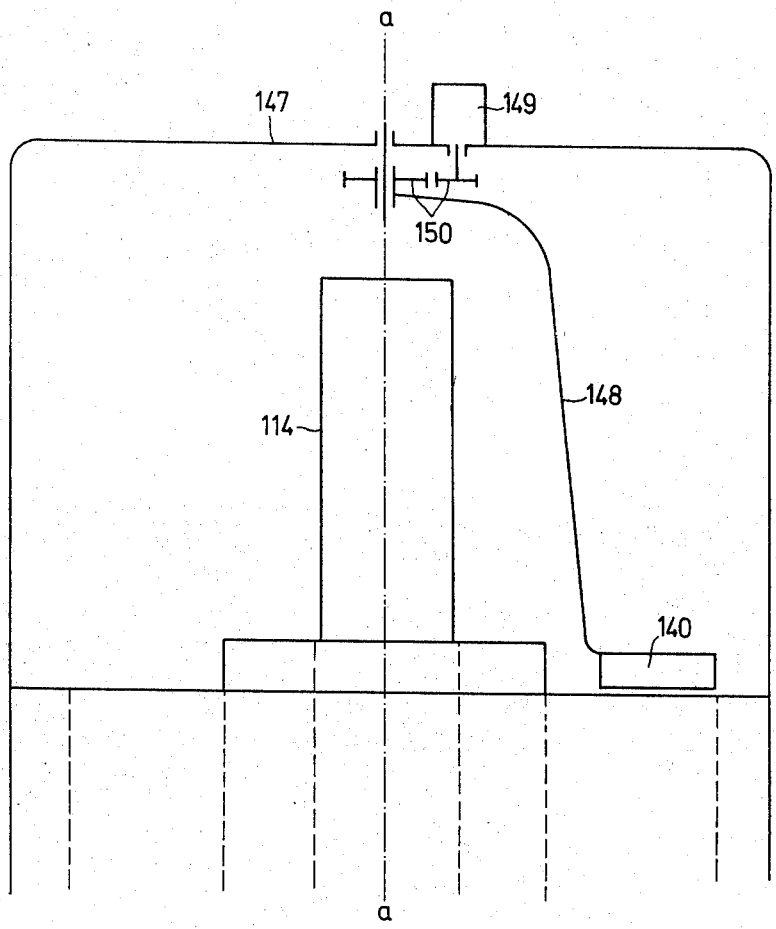
FIG. 4 shows diagrammatically a modification of the driving means for the wiper of an apparatus similar to that as shown in FIG. 2.

FIGS. 2 to 4, in which the parts which are similar to those in FIG. 1 are indicated by reference numerals which are the same as those applied in FIG. 1 except for being increased by 100, illustrate an apparatus according to the invention in which the different containers, chambers or the like are combined into a circular unit and have a common vertical axis $a$—$a$. This unit comprises a lower separating or settling and clarifying apparatus and an upper coagulator 114 which comprises a circulating chamber which is mounted on the upper end of a central cylindrical space 130. The separating apparatus 129 comprises an additional substantially annular mixing chamber 121 which directly surrounds the cylindrical space 130 and extends coaxially to this space and to the circulating chamber 114, and around the mixing chamber 121 a separating or settling chamber 124 into which the sludgy liquid enters from the mixing chambers 121 via an intermediate overflow edge. Within this separating chamber 124 the foamy paint sludge rises to the surface of the liquid where it gradually solidifies into a foam cake 125. The separating apparatus 129 further comprises an outer substantially annular overflow chamber 131 which directly surrounds the separating chamber 124 and is separated therefrom by a solid upper wall 127a and underneath and connected to the latter by a substantially annular filter wall 127 so that the liquid can pass from the chamber 124 into the chamber 131 only underneath the solid upper wall 127a through the filter wall 127, while the foamy paint particles remain in chamber 124 and collect on the surface of the liquid. From the overflow or clearing chamber 131 the filtered water may pass over an overflow edge 132a which may, for example, be serrated into a substantially annular discharge chamber 132 from which the purified water may flow off through a discharge line 128.

The coagulator 114 forming a circulating chamber comprises an outer housing 117, an inner pipe 118, and an annular chamber 119 around the pipe 118, and it is mounted, for example, by means of a flange 133, on the top wall 134 of an inner chamber 130 to which it may be removably secured by a quickly releasable locking device, not shown. Into the lower end of the coagulator 114 an injection nozzle 113 projects which is disposed within the common axis $a$—$a$ of the entire unit and through which the watery mixture is injected under pressure which is supplied to the nozzle from the additional mixing chamber 121 of the separating apparatus through a line 112a and by means of a pump 112. The coagulant is conducted directly into the coagulator 114 separately from and independently of the injection nozzle 113 but in the vicinity of the latter by means of a pump 135. The water and paint mixture which is to be treated in the apparatus is conducted without pressure through a line 110 directly into the coagulator. Furthermore, compressed air is conducted into the coagulator 114 through a line 116 and also into the additional mixing chamber 121 through a nozzle 136.

The upper end of the coagulator 114 is closed by a cover 137 which is screwed to the housing 117 and prevents the water current which is ejected from the nozzle 113 from being sprayed out of this apparatus as long as it is still empty. This cover also insures that the mixture which is formed within the coagulator will be properly circulated therein. Between the cover 137 and the housing 117 of the coagulator a substantially annular slot 138 is provided the width S of which may be varied, for example, by screwing the cover upon the housing so as to be spaced at different distances from the upper end of its wall. A cap-shaped cover plate 139 guides the mixture emerging from the slot 138 in the downward direction so that it will flow directly into the open upper end of the additional mixing chamber 121.

For removing the foamlike sludge 125 which has been formed on the surface of the liquid in the settling or stilling chamber 124, a wiper 140 on a wiper arm 141 is provided which projects, for example, through a slot 141a underneath the top wall 134 of the central chamber 130 and is driven through a gearing 142, for example, by means of an electric motor.

As illustrated in FIG. 3, at least the chambers 124, 131 and 132 are not completely annular but are interrupted by a sector 143 which is defined by the walls 146 and permits a sludge carriage 144 or any other container to be moved into this sector. Downwardly inclined discharge plates 145 may project from the walls 146 over a part of the sector 143 so that when the wiper 140 is reciprocated in the directions $x_1$ and $x_2$ between the walls 146 of the otherwise annular chamber 124, it will wipe the sludge from this chamber upon the discharge plates 145 from which it slides directly into the sludge carriage 144 or the like.

By passing the liquid to the injection nozzle 113 from the lower part of the additional mixing chamber 121 through the line 112a and the pump 112 and by thus injecting into the coagulator 114 the liquid which has already been partly purified by the floatation of the paint particles in this chamber, a supply of fresh water to the injection nozzle 113 may be omitted partly or entirely. In the coagulator 114 to which the water and paint mixture or paint suspension is supplied not under pressure through the line 110, this suspension is mixed with the partly cleaned water which is ejected under pressure from the nozzle 113 while at the same time the coagulant is added through the line 115 and the compressed air through the line 116. An intimate mixture of the water with the paint particles, the coagulant and air is thus produced at the inside of the coagulator 114 which results in the formation of a watery foam which may flow over to the outside of the coagulator at its upper end through the slot 138 and then downwardly in the direction of the arrow $y$ into the additional mixing chamber 121 in which, if desired, this liquid foam may be mixed once more with compressed air through the nozzle 136. From this additional mixing chamber 121 the foam may then flow over into the settling or stilling chamber 124 in which the foam rises to and collects on the surface of the liquid so as to form a tough foamy sludge 125 which is then shoved by the reciprocating wiper 140 over the inclined discharge plates 145 into the sludge carriage 144. After being thus at least partly purified, the water flows from the settling chamber 124 underneath the solid separating wall 127a through the annular filter wall 127 into the outer overflow chamber 131 from which the purified water flows over the annular serrated edge 132a into the discharge chamber 132 and from the latter through the discharge line 128 to the sewer or the like.

FIG. 4 illustrates a modification of the apparatus as shown in FIGS. 2 and 3 which differs from the latter by mounting the wiper 140 on an arm 148 which extends outwardly of the coagulator 114 to a position above the latter where it is connected to a drive mechanism which may consist, for example, of an electric motor 149 and a gearing 150 and may be mounted on a cover wall, bracket or other supporting element 147. This construction has the advantage over the construction as shown in FIGS. 2 and 3 that there is no need to provide a slot like the slot 141a in the upper end of the inner wall of chamber 121, and that, if desired, the wiper 140 may be driven so as to move continuously in one circular direction.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

I claim:

1. A plant for separating paint or the like from water comprising a substantially cylindrical coagulator having a coagulating chamber and mixing means for forming an intimate mixture of a liquid containing paint and water with a coagulant in said coagulating chamber so as to form a foamy mixture; a separating container for separating the foamy solids from the liquid by floating the solids to the surface of the liquid, said coagulator being arranged substantially above, along a common axis with, and radially inside of said separating container and being provided with opening means near its upper end adapted to form an overflow for the passage of the foamy mixture formed in said coagulator to said separating container; means for removing the solids from the surface of the liquid in said separating container; and means for discharging water from said separating container.

2. A plant as defined in claim 1, wherein said opening means comprise an annular slot near the upper end of said coagulator.

3. A plant for separating paint or the like from water comprising a substantially cylindrical coagulator having a coagulating chamber and mixing means for forming an intimate mixture of a liquid containing paint and water with a coagulant in said coagulating chamber so as to form a foaming mixture; a separating container for separating the foamy solids from the liquid, said coagulator being arranged substantially above, along a common axis of axis with and radially inside of said separating container and being provided with an annular slot near its upper end and adapted to form an overflow for the passage of the foaming mixture formed in said coagulator to said separating container; adjusting means for varying the width of said annular slot and comprising a cover closing the upper end of said coagulating chamber and adapted to be screwed upon said coagulating chamber at different distances from said upper end; means for removing the solids from the surface of the liquid in said separating container; and means for discharging water from said separating container.

4. A plant for separating paint or the like from water comprising a coagulator having a coagulating chamber having an upright axis and mixing means for forming an intimate mixture of a liquid containing paint and water with a coagulant in said coagulating chamber so as to form a foamy mixture; discharge means for discharging said mixture from said coagulating chamber; a separating apparatus connected to said discharge means and comprising separating container means substantially coaxial with said axis, radially out-side of said coagulator and forming a unit therewith, said separating container means comprising radially from the inside to the outside first a mixing chamber, then an annular settling chamber and then an annular overflow chamber, said settling chamber being separated from said overflow chamber by a walll having an upper impermeable wall portion and a lower annular filter wall portion so that the upper more solid parts of the contents of said settling chamber wil be retained therein, while the more liquid lower parts of said contents can penetrate through said filter wall portion to said overflow chamber.

5. A plant for separating paint or the like from water comprising a coagulator having a coagulating chamber defined by a housing having an upright axis, a peripheral wall about said axis, a lower and an upper end, and mixing means for forming an intimate mixture of a liquid containing paint and water with a coagulant in said coagulating chamber so as to form a foaming mixture, said mixing means comprising first conduit means for conducting a liquid containing paint and water at high velocity into said housing and having an end part terminating in said housing substantially in the direction of said axis, inner wall means within and spaced from said peripheral wall of said housing and from said upper and said lower ends thereof, second and third conduit means adjacent to said first conduit means for respectively conducting a coagulant and air into said housing, whereby said mix-ture is circulated repeatedly around said inner wall means; discharge means for discharging said mixture from said coagulating chamber; a separating apparatus connected to said discharge means and comprising at least one separating container for separating the foamy solids of said mixture from said liquid by floating said solids to the surface of said liquid, said separating container having a substantially annular shape and being arranged substantially co-axial with said axis, said coagulator being disposed radially inside of said separating container and at least a substantial part of said coagulator being disposed on and above said separating container; means for removing said foamy solids from the surface of the liquid so as to purify the water thereof; and means for discharging the purified water from the separating container.

6. A plant for separating paint or the like from water comprising a coagulator; first conduit means for conducting a liquid containing paint and water into said coagulator; second and third conduit means for conducting a coagulant and a gaseous medium, respectively into said coagulator; mixing means in said coagulator for forming an intimate foamy mixture of said liquid, said coagulant and said gaseous medium; discharge means for discharging the mixture from the coagulator; a substantially annular separating container following said coagulator in the direction of flow of liquid for receiving the mixture from said discharge means and for separating the foamy solids from the liquid, said coagulator being arranged substantially along a common axis with, above, and radially inside of said separating container so as to define below said coagulator and inwardly of said annular separating container a free space, and said conduit means bbeing disposed substantially within said free space.

7. A plant as defined in claim 5, wherein said discharge means comprise an annular slot near the upper end of said coagulator adapted to form an overflow for the passage of the foamy mixture formed in said coagulator to said separating container.

8. A plant as defined in claim 5, wherein said substantially annular separating container defines below said coagulator a free space, said first, second and third conduit means passing upwardly through said free space.

9. A plant as defined in claim 5, wherein said separating container comprises radially from the inside to the outside first a mixing chamber, then an annular settling chamber and then an annular overflow chamber, said settling chamber having an outer peripheral wall separating said settling chamber from said overflow chamber, at least part of said wall forming an annular filter wall.

10. A plant as defined in claim 9, further comprising an annular discharge chamber surrounding said overflow chamber and separated therefrom by a wall having a serrated upper edge, and conduit means for discharging the purified water from said discharge chamber.

* * * * *